Sept. 28, 1965  R. A. KEIDEL ETAL  3,209,119
METHOD AND APPARATUS FOR WELDING
Filed April 18, 1963  3 Sheets-Sheet 1
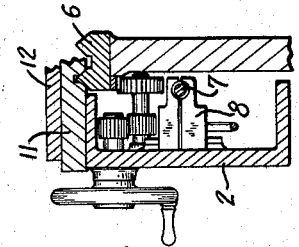
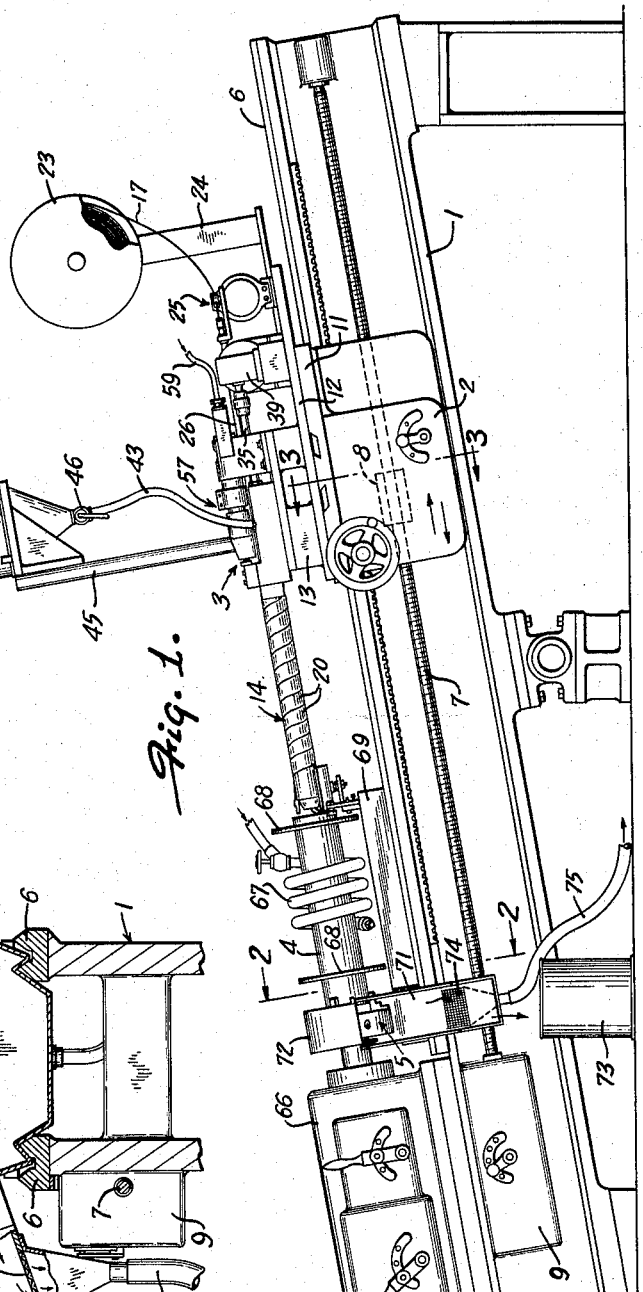
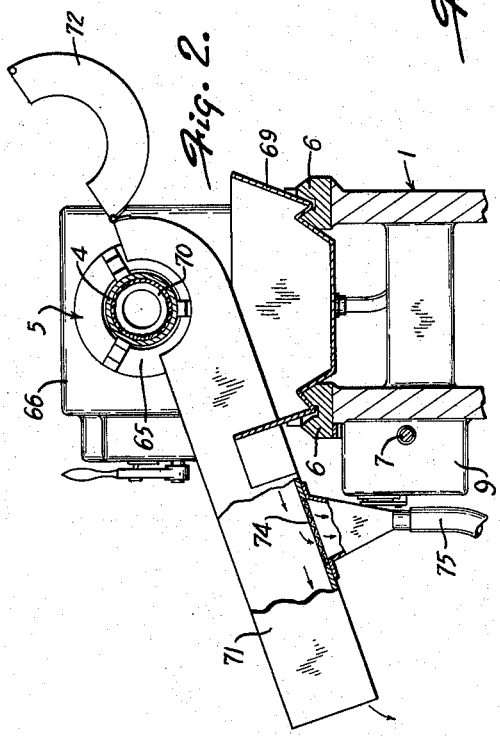
INVENTORS.
RALPH A. KEIDEL
SOLOMON KELLER
BY GEORGE METROPULOS
Andrus & Starke
ATTORNEYS

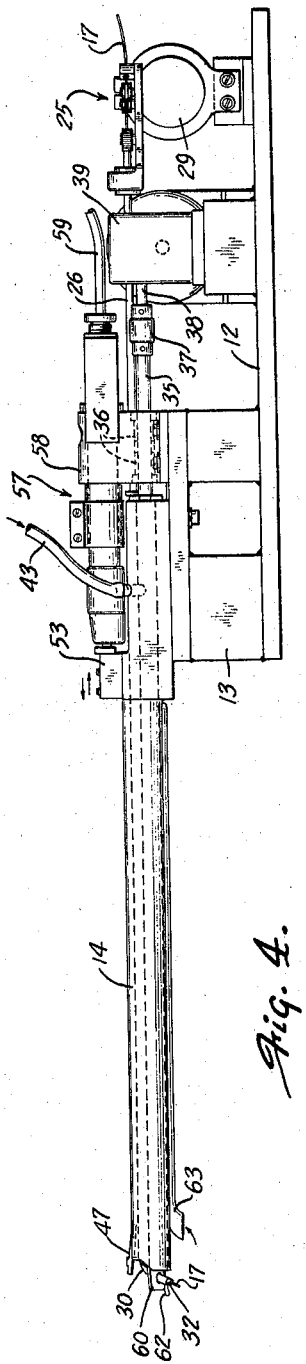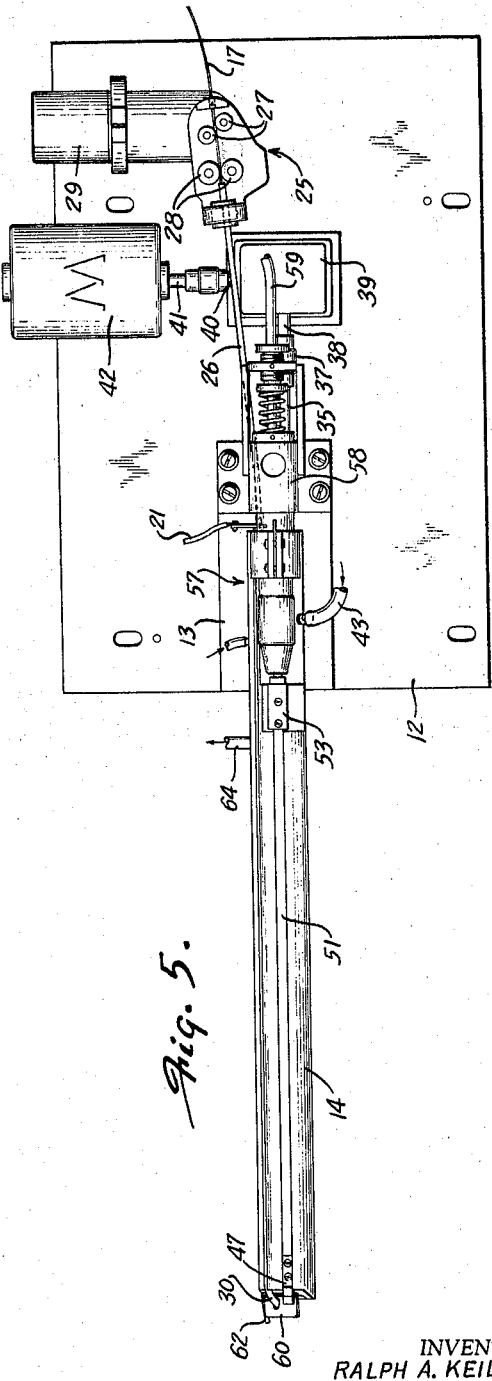

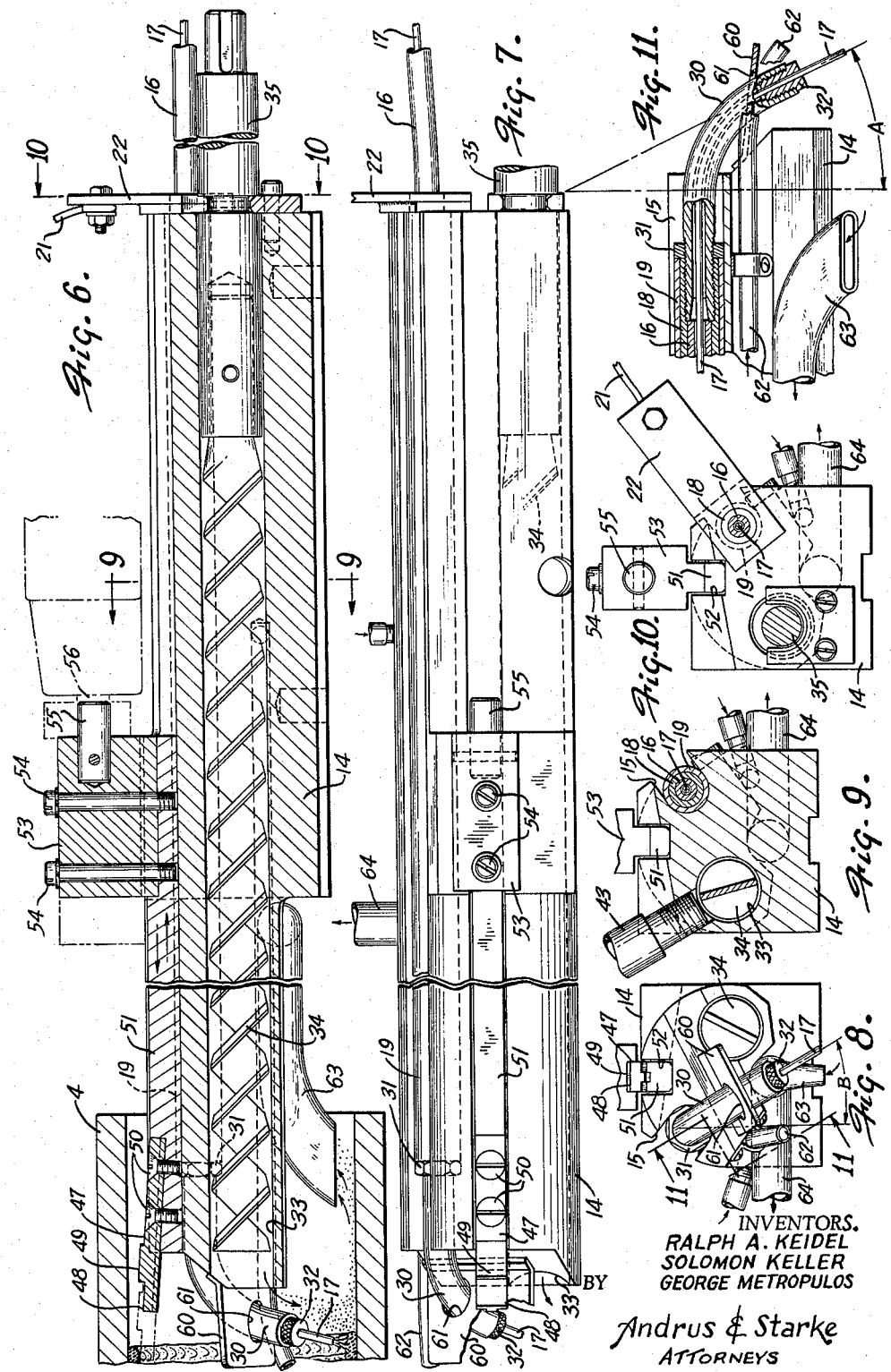

United States Patent Office 3,209,119
Patented Sept. 28, 1965

3,209,119
METHOD AND APPARATUS FOR WELDING
Ralph A. Keidel, West Allis, Solomon Keller, Milwaukee, and George Metropulos, Menomonee Falls, Wis., assignors to A. O. Smith Corporation, Milwaukee, Wis., a corporation of New York
Filed Apr. 18, 1963, Ser. No. 273,936
15 Claims. (Cl. 219—76)

This invention relates to a method and apparatus for welding and more particularly to an apparatus for weld deposit cladding the internal surface of small diameter tubes.

In certain applications when dealing with corrosive materials it is desirable to line the internal surface of small diameter carbon steel tubing with a corrosion resistant alloy, such as stainless steel. Normally, small diameter tubes having an internal diameter of 2 to 3 inches are produced by co-extrusion in which an inner stainless steel sleeve is extruded simultaneously with a carbon steel shell. The co-extrusion process is costly and the bond between the stainless steel and carbon steel does not always fulfill the specification requirements. It has also been proposed to clad the internal surface of a carbon steel tube with stainless steel, but the cladding processes developed in the past have been even more costly than co-extrusion.

The present invention is directed to a method and apparatus for weld deposit cladding the internal surface of small diameter tubing which greatly reduces the cost over prior methods and produces an improved stainless steel-to-carbon steel bond. According to the invention, the internal surface of the carbon steel tube is clad with stainless steel by a submerged arc welding process. In this process the tube is inclined and mounted for rotation in a chuck. A mandrel is inserted within the tube and a consumable electrode is fed through an opening in the mandrel and an arc is established between the electrode and the tube to melt the electrode and deposit a weld bead. The mandrel and the consumable electrode are moved longitudinally in an uphill direction with respect to the inclined rotating tube to provide a generally spiral weld bead on the internal surface of the tube.

A welding flux is employed to submerge the arc and the flux is fed through a passage in the mandrel to the area of the arc. In addition, a vacuum mechanism is associated with the mandrel and located upwardly in the direction of mandrel travel from the arc and serves to remove any excess flux which may jam between the mandrel and the tube.

In order to remove the slag from the weld, a chipping mechanism is associated with the mandrel. The chipping mechanism includes a chipping head which reciprocates axially of the mandrel and serves to engage and chip the slag from the weld bead. Due to the inclined attitude of the tube, the slag tumbles downhill to the lower end of the tube. To aid in slag removal a stream of air is employed which is located downwardly of the electrode and serves to move the chipped slag to the lower end of the tube.

The present invention substantially reduces the cost of cladding the internal surface of small diameter tubing and in addition provides improved ductility and bond strength between the stainless steel and carbon steel.

Other objects and advantages will appear in the course of the following description.

The drawings illustrate the best mode presently contemplated of carrying out the invention.

In the drawings:

FIG. 1 is a side elevation of the welding apparatus of the invention;
FIG. 2 is a view taken along line 2—2 of FIG. 1 with parts broken away in section;
FIG. 3 is a section taken along line 3—3 of FIG. 1;
FIG. 4 is a side elevation of the welding head;
FIG. 5 is a plan view of the welding head;
FIG. 6 is a longitudinal section of the mandrel;
FIG. 7 is a plan view of the mandrel;
FIG. 8 is an end view of the mandrel;
FIG. 9 is a transverse section taken along line 9—9 of FIG. 6;
FIG. 10 is a rear end view of the mandrel taken along line 10—10 of FIG. 6; and
FIG. 11 is a fragmentary section of the forward end of the mandrel taken along line 11—11 of FIG. 8.

The drawings illustrate an apparatus for welding the internal surface of small diameter tubing, and includes a stationary bed 1 which supports a movable carriage 2. A welding head 3 is mounted on the movable carriage 2 and is adapted to weld deposit clad the internal surface of a small diameter tube 4 which is mounted for rotation on a chuck 5.

The bed 1 includes a pair of spaced, longitudinal rails 6 on which the carriage 2 is adapted to ride. The carriage is driven on the bed by a drive worm 7 which extends the length of the bed and is engaged with an internally threaded block 8 on the carriage 2. The drive worm 7 is rotated by a motor-transmission unit 9 to rotate the drive worm 7 and thereby move the carriage 2 along the bed.

The carriage 2 is provided with a pair of guides 11 which slide along the rails 6 on the bed, and a support plate 12 is secured across the guides and carries the welding head 3. The particular structure of the bed and carriage is not critical to the invention and any type of structure can be employed which will permit the carriage and welding head 3 to move longitudinally of the tube 4 to be welded.

The welding head 3 includes a supporting structure or frame 13 which is mounted on plate 12, and a mandrel 14 is supported by the frame 13 and extends outwardly from the frame toward the tube 4. The mandrel is secured to the upper surface of the frame 13 by a series of bolts.

As best shown in FIGS. 7 and 10, the mandrel 14 is provided with a slot or recess 15 which extends the length of the mandrel, and a stainless steel tube 16 is mounted within the recess 15 and is adapted to guide a consumable electrode 17 from a supply location to the arc.

The guide tube 16 is located within a metal contact tube 18, formed of aluminum bronze or the like, and contact tube 18 is covered with an insulating sleeve 19 which electrically insulates the tube 18 from the mandrel 14. The tube assembly is secured within the recess 15 by windings of an insulating tape 20, such as glass fiber tape, which are wound around the mandrel and thereby serve to retain the tube assembly within the recess 15.

Electrical energy is supplied to the contact tube 18 by power line 21 which is connected to terminal 22 secured to the end of tube 18, as best shown in FIG. 9.

The consumable electrode 17 is contained in coiled form on a reel 23 which is supported by bracket 24 from the plate 12. The electrode is fed to the arc by a standard wire feed unit 25 mounted on plate 12, and is guided from the feed unit 25 to the tube 16 by an inlet guide tube 26 which is secured within the rear end of the tube 17.

The wire feed unit 25 is of conventional construction and includes a pair of guide rolls 27 and a pair of feed rolls 28 which are driven by a suitable drive unit 29. The electrode 18 is guided by rolls 27 to the feed rolls 28 which drive the electrode 17 through the inlet guide tube 26 and tube 16 to the arc.

A curved forward guide tube 30 is threaded within the forward end of the tube 18, as best shown in FIG. 10, and is locked with respect to the tube 18 by a lock nut 31. The forward guide tube 30 is elbow-shaped and is bent at an angle with respect to the axis of the tube 18. A contact tip 32 is threaded within the outer end of the guide tube 30 and serves to supply the electrical current to the electrode.

As best shown in FIG. 10, the angle A between the axis of the electrode, as it emerges from tip 32, and a plane perpendicular to the axis of tube 18, should be in the range of 15° to 30° with about 25° being preferred. This angularity of the electrode prevents metal pile-up under the arc. In addition, the axis of the electrode as it emerges from tip 32 is tilted at an angle B, as shown in FIG. 8, of 5° to 20° with respect to a vertical plane through the axis of tube 18. The tilt is in a direction opposite to the direction of rotation of the tube. It has been found that tilt angle B of about 7½° is preferable and this tilt in the direction opposite to the direction of rotation of the tube serves to provide a bead of proper width and surface contour. If the electrode is not tilted, and lies in a vertical plane passing through the axis of tube 17, the bead will tend to spread out in width and be concave or dish-shaped.

A welding flux is introduced to the arc through a longitudinal flux passage 33 in the mandrel 14. The flux is conveyed through the passage by a spiral flight or auger 34 so that the welding flux tumbles out of the forward end of the passage 33 and submerges the arc.

The outer end of the auger 34 is connected to a stub shaft which is journalled within bearings 36. The outer end of the shaft 35 is attached by a universal coupling 37 to the output shaft 38 of a gear reduction unit 39. The input shaft 40 of the unit 39 is connected to the drive shaft 41 of a motor 42. The reduction unit 39 and motor 42 are mounted on the plate 12. The use of the universal coupling 37 compensates for any mis-alignment between the auger 34 and the flux passage 33 and insures that the auger will rotate freely within the passage.

The welding flux is fed by gravity through a flux feed tube 43, as shown in FIG. 1, which extends through an opening in the mandrel and communicates with the passage 33. The flux is contained within the hopper 44 carried on column 45 which is mounted to the plate 12. A suitable valve 46 is located in the flux feed tube 43 and controls the flow of flux through the tube.

A provision is also made to progressively remove the slag from the weld deposit on the internal surface of tube 4. This is accomplished by a chipper mechanism which is carried by the mandrel 14. The chipper mechanism includes a chipping blade 47 having a sharpened edge 48 which engages the slage and chips or knocks the slag from the weld deposit. In addition to the edge 48, the chipper blade is provided with a shoulder 49 which acts against the bottom of the slag and further aids in slag removal.

The chipper blade 47 is reciprocated longitudinally of the mandrel 14 and is attached by screws 50 to a reciprocating bar 51, which is slidably disposed within a recess 52 in mandrel 14. The outer end of bar 51 is attached to block 53 by studs 54, and a coupling 55 connects the block 53 with the head or piston 56 of an air motor unit 57. The unit 57 is mounted on the supporting structure 13 by a mounting bracket 58, and an air line 59 supplies air to the unit 57.

The air motor unit 57 is of conventional construction and air being introduced to the unit provides a fast, reciprocating action for the bar 51 and chipper blade 47 so that the blade engages and chips the slag from the weld deposit. While the description shows an air actuated mechanism for providing the reciprocating motion for the chipper blade, it is contemplated that any other hydraulic, electrical or mechanical structure can also be employed in place of the air motor.

To prevent the chipped slag from contacting and disrupting the arc, a shield 60 extends outwardly from the forward end of the mandrel and is disposed at an angle of 5° to 15° with respect to the axis of the mandrel. The shield 60 is provided with an opening 61 and the forward feed tube 30 extends through the opening. The shield serves to deflect the chipped slag downwardly of the inclined tube and prevents the slag particles from contacting the arc.

As the tube 4 and mandrel 14 are mounted at an angle to the horizontal, the chipped slag will tumble downwardly within the tube and is removed from the lower end of the tube. To aid in the slag removal, an air tube 62 is secured to the outer surface of the mandrel by the wrapping 20 and is connected to a suitable source of air or other gas under pressure. The forward end of the air tube 62 extends forwardly or downhill beyond the arc so that the air emerging from the tube 62 will not contact the arc or weld bead. The air serves to blow the chipped slag downwardly within the tube 4 and facilitates the removal of the slag from the tube.

To prevent jamming of flux between the lower surface of the mandrel 14 and the tube 4, a vacuum tube 63 is attached to the outer surface of the mandrel by winding 20 and serves to remove any flux located within the space between the mandrel and the tube. As best shown in FIG. 8, the forward end of the vacuum tube is crimped in a longitudinal direction so that the opening in the tube is oval shaped and is generally parallel to the lower surface of the mandrel. The outer end of vacuum tube 63 is attached to a conduit 64 which is connected to a vacuum pump, not shown. As previously mentioned, the vacuum tube serves to withdraw any loose flux between the mandrel and the tube so that the mandrel can move axially without jamming.

The chuck 5, which supports the tube 4, is mounted on bed 1 and is of conventional design. The chuck includes a rotating clamping member 65 which engages the lower end of the tube 4 and is driven by a suitable drive unit 66. The chuck itself forms no part of the invention, and any conventional chuck or rotating support device can be employed to rotate tube 4.

The tube 4 is cooled during the welding operation by a cooling medium which flows within a cooling coil 67 which is wrapped around the tube and is spaced therefrom. The coil 67 is provided with a series of openings which are directed toward the tube, and water or other cooling medium is passed through the cooling coil and into contact with the outer surface of the tube to cool it. A pair of shields or baffles 68 are temporarily secured to the ends of the tube to restrict the flow of the cooling water along the tube and a pan 69 is located beneath the coil 67 and serves to collect the water as it falls from the tube 4. As the welding is done on the internal surface of the small diameter tube, heat buildup during welding is a considerable problem. Without the use of the cooling media, heat buildup, as the welding progresses, tends to increase the solidification time of both the slag and the metal to the point where molten metal will wash away from the weld area, and this results in wide beads with concave centers. The introduction of cooling water to the outer surface of the tube 4 greatly improves the bead and layer appearance.

An annular plug 70 or baffle is attached within the lower end of the tube 4 and the plug is provided with a central opening which is substantially smaller than the internal diameter of the tube. The plug 70 serves to retain a portion of the flux which is introduced into the tube 4 and prevents the flux from falling out of the tube before the initial welding passes are made. During the welding operation, the flux and slag pass through the central opening in the baffle 70 into a trough 71. The lower end of the tube 4 and clamping member 65 are enclosed by a hood 72 which is pivoted to the trough and serves to deflect flux and slag to the trough. The trough 71 extends downwardly to a container 73 which collects the slag. To recover the unused flux, the trough 71 is provided with a screen 74 or other perforated member and the smaller particles of flux are drawn through the screen 74 by a vacuum hose 75 to a suitable collection bin. The slag particles being larger will not pass through the screen 74, but will move directly to the container 73. This construction enables the flux and the slag to be separated and permits the flux to be re-used during the welding process.

The deposit weld is preferably made using a D.C., constant potential reverse polarity process with full wave rectification.

The process is particularly adaptable to small diameter tubing having a diameter in the range of 2 to 4 inches, but it can be used with larger diameter tubing as well. While the description has been based particularly on the weld deposit cladding of stainless steel to the internal surface of a carbon steel tube, it is contemplated that any desired base metal and weld deposit metal may be used.

The composition of the flux to be used depends upon the metals to be welded. Any conventional flux composition can be employed which is suitable or compatible to the metals being welded. The particle size of the flux is of particular importance and is more critical as the diameter of the tube 4 decreases. When welding tubes having an internal diameter of 3 inches or less, it is important that the particle size of the flux be less than 16 mesh, and generally the flux is screened to the following specifications:

| Mesh size: | Percent flux retained on screen |
| --- | --- |
| 35 | 7–11 |
| 65 | 45–55 |
| 100 | 28–32 |
| 150 | maximum 10 |

The tube or workpiece 4 is tilted at an angle of about 10 degrees to the horizontal and the welding is performed uphill from the lower to upper end of the tube. The tilt of the tube enables the slag to tumble downhill toward the lower end of the tube and also effects the wash of the weld. The weld bead being deposited will flow downhill and provide an overlap on the prior weld bead so that a smoother surface is obtained which requires less machining of the weld deposit. In addition to the tilt of the tube 4, the axis of the electrode is located at an angle of 15° to 30° with respect to a plane perpendicular to the axis of the tube 16. This angular location of the electrode decreases the metal pile-up under the arc.

The electrode is also tilted circumferentially with respect to a vertical plane passing through the axis of the tube, and this tilt is at an angle of from 5° to 20° in the opposite direction to that of tube rotation. This backward tilt of the electrode prevents concave or dish-shaped beads being formed.

The slag is progressively removed from the weld deposit as the tube is rotated. The slag which is chipped from the weld deposit is deflected by the shield 60 and tumbles downwardly to the lower end of the tube. In addition, the air passing through air passage 62 aids in blowing the chipped slag to the lower end of the tube. Any excess flux which may flow within the space between the mandrel and the tube, is removed from this space by the vacuum mechanism so that the flux will not interfere with the axial movement of the mandrel.

As the welding is carried on within the small diameter tube, there is little chance for the heat to be dissipated so that considerable heat buildup occurs. The cooling water reduces the heat buildup and increases the bead and layer appearance.

A specific example of the welding process is as follows:

A carbon steel tubes having an internal diameter of 3.218 inches was mounted in a chuck at an angle of 10 degrees to the horizontal. The carbon steel had the following composition in weight percent.

| | |
| --- | --- |
| Carbon | 0.17 |
| Manganese | 0.43 |
| Phosphorus | 0.014 |
| Sulfur | 0.031 |
| Iron | balance |

Various modes of carrying out the invention are contemplated as being within the scope of the following claims particularly pointing out and distinctly claiming the subject matter which is regarded as the invention.

We claim:

1. An apparatus for welding the internal surface of small diameter tubes, comprising means for mounting the tube at an angle to the horizontal, means for rotating the tube about the axis thereof, a welding head including an elongated mandrel adapted to be inserted within the tube, means for moving the mandrel and the tube axially with respect to each other, said mandrel having a longitudinal electrode passage terminating at the forward end of said mandrel, means for feeding a consumable electrode through said electrode passage, means for establishing an arc between the forward tip of the electrode and the tube to thereby melt the electrode and deposit the weld bead on the internal surface of said tube, and means for introducing a welding flux to the arc to submerge the same.

2. An apparatus for welding the internal surface of small diameter tubes, comprising means for mounting the tube at an angle to the horizontal, means for rotating the tube about the axis thereof, a welding head including an elongated mandrel adapted to be inserted within the tube, means for moving the mandrel axially with respect to the axis of the tube, said mandrel having an electrode passage extending the length of the mandrel and terminating at the forward end of said mandrel, means for feeding a consumable electrode through said electrode passage, means for establishing an arc between the forward tip of the electrode and the tube to thereby melt the electrode and deposit the weld bead on the internal surface of said tube, a generally curved guide member having one end communicating with the forward end of said electrode passage and serving to guide the electrode from said passage and having the opposite end disposed at an angle of 20° to 30° with respect to a transverse plane perpendicular to the axis of said passage, said opposite end of the guide member being displaced circumferentially from 5° to 20° in a direction from a vertical plane passing through the axis of the passage and in a direction opposite to the direction of said tube.

3. An apparatus for welding the internal surface of small diameter tubes, comprising means for mounting a tube at an angle of 3° to 20° with respect to the horizontal, a welding head including an elongated mandrel adapted to be inserted within the tube, means for rotating the tube about the axis thereof, means for moving the mandrel in an uphill direction from the lower end of said tube member to the upper end, said mandrel having a longitudinal electrode passage and having a flux passage extending longitudinally thereof, means for feeding a consumable electrode through said electrode passage with said electrode projecting beyond the forward end of said mandrel, means for establishing an arc between the projecting end of the electrode and the tube to thereby melt the electrode and deposit a weld bead on the inner surface of said tube, means for feeding a flux composition through said flux passage to submerge the arc, and means located beneath the mandrel for withdrawing excess flux located between the mandrel and the tube.

4. An apparatus for welding the internal surface of small diameter tubes, comprising, means for mounting a tube at an angle of 3° to 20° with respect to the horizontal, a welding head including an elongated mandrel adapted to be inesrted within the tube, means for rotating the tube about the axis thereof, means for moving the mandrel in an uphill direction from the lower end of said tube member to the upper end, said mandrel having an electrode passage extending the length thereof, means for feeding a consumable electrode through said electrode passage with said electrode projecting beyond the forward end of said mandrel, means for establishing an arc between the projecting end of the electrode and the tube to thereby melt the electrode and deposit a weld bead on the inner surface of said tube, slag removal means associated with the mandrel and located above the projecting end of the electrode, and means located externally of the mandrel and operably connected to the slag removal means for actuating said slag removal means to thereby remove the slag from the solidified weld deposit.

5. An apparatus for deposit welding the internal surface of small diameter tubes, comprising means for mounting the tube at an angle to the horizontal, means for rotating the tube about the axis thereof, a consumable electrode adapted to be inserted within the tube, the tip of the electrode extending at an angle of 20° to 30° with respect to a transverse plane perpendicular to the axis of said tube and said tip of the electrode being displaced circumferentially 5° to 20° in a direction from a vertical plane passing through the axis of the tube and in a direction opposite to the direction of rotation of said tube, means for establishing an arc between the electrode and the tube to melt the electrode and deposit a weld bead on the internal surface of said tube, and means for feeding the electrode to the arc at a rate determined by the rate of burn-off of the electrode at the arc.

6. An apparatus for welding the internal surface of small diameter tubes, comprising mounting the tube at an angle of 3° to 20° with respect to the horizontal, means for rotating the tube about the axis thereof, a welding head including an elongated mandrel adapted to be inserted within the tube, means for moving the welding head axially with respect to the axis of the tube, said mandrel having an electrode passage terminating at the forward end of the mandrel and said mandrel having a flux passage terminating at the forward end thereof, means for feeding a consumable electrode through said electrode passage with an end of said electrode projecting beyond the forward end of said mandrel, means for establishing an arc between the projecting end of the electrode and the tube to thereby melt the electrode and deposit a weld bead on the inner surface of said tube, means for feeding a welding flux through said flux passage to submerge the arc, a slag chipping member associated with the mandrel and located above the projecting end of the electrode, and means located externally of the mandrel and operably connected to the chipping member for reciprocating said chipping member to thereby remove the slag from the solidified weld deposit.

7. The structure of claim 6 in which the chipping member includes a sharpened chipping blade located at the end of the chipping member and a shoulder located rearwardly of the blade, said shoulder being disposed upwardly of the blade and adapted to engage the base of the slag on the weld deposit to aid in removal of the slag.

8. The structure of claim 6, and including a shield extending outwardly from the forward end of the mandrel and located between the chipping member and the projecting end of the electrode, said shield preventing the chipped slag from contacting and disrupting the arc.

9. An apparatus for welding the internal surface of small diameter tubes, comprising, means for mounting a tube at an angle of 3° to 20° with respect to the horizontal, a welding head including an elongated mandrel adapted to be inserted within the tube, means for rotating the tube about the axis thereof, means for moving the mandrel in an uphill direction from the lower end of said tube member to the upper end, said mandrel having an electrode passage extending the length thereof and having a flux passage extending longitudinally thereof, means for feeding a consumable electrode through said electrode passage with said electrode projecting beyond the forward end of said mandrel, means for establishing an arc between the projecting end of the electrode and the tube to thereby melt the electrode and deposit a weld bead on the inner surface of said tube, means for feeding a flux composition through said flux passage to submerge the arc, slag chipping means associated with the mandrel and located above the projecting end of the electrode, and blowing means for blowing the chipped slag toward the lower end of said tube, said blowing means discharging a stream of gas at a location forwardly beyond the projecting tip of the electrode toward the lower end of the tube so that the gas stream does not interfere with the arc.

10. An apparatus for welding the internal surface of tubes, comprising means for mounting the tube at an angle to the horizontal, means for rotating the tube about the axis thereof, a welding head including an elongated mandrel adapted to be inserted within the tube, means for moving the mandrel and the tube relatively to each other in an axial direction, said mandrel having a longitudinal electrode passage terminating at the forward end of said mandrel and having a longitudinal flux passage terminating at the forward end of said mandrel, means for feeding a consumable electrode through said electrode passage, means for establishing an arc between the forward tip of the electrode and the tube to thereby melt the electrode and deposit a weld bead on the internal surface of said tube, an auger disposed within said flux conveying passage, and means for driving the auger to thereby convey the flux through said flux passage toward the arc.

11. The structure of claim 1, and including means for flowing a stream of cooling water against the outer surface of said tube to cool said tube.

12. An apparatus for welding the internal surface of small diameter tubes, comprising means for mounting the tube at an angle to the horizontal, means for rotating the tube about the axis thereof, a welding head including an elongated mandrel adapted to be inserted within the tube, means for moving the mandrel and the tube axially with respect to each other, said mandrel having a longitudinal electrode passage terminating at the forward end of said mandrel, means for feeding a consumable electrode through said electrode passage, means for establishing an arc between the forward tip of the electrode and the tube to thereby melt the electrode and deposit the weld bead on the internal surface of said tube, means for introducing a welding flux to the arc to submerge the same, means carried by the mandrel for chipping the slag from the weld bead on the inner surface of said tube, the chipped slag and said flux moving downwardly within the tube toward the lower end thereof, and means located at the lower end of the tube for separating the flux from the slag.

13. The structure of claim 4, in which said slag removal means constitutes a chipping member mounted for reciprocating movement with respect to said mandrel.

14. An apparatus for welding the internal surface of small diameter tubes, comprising means for mounting the tube at an angle to the horizontal, means for rotating the tube about the axis thereof, a welding head including an elongated mandrel adapted to be inserted within the tube, means for moving the mandrel and the tube axially with respect to each other, said mandrel having a longitudinal electrode passage terminating at the forward end of said mandrel, means for feeding a consumable electrode through said electrode passage, means for establishing an arc between the forward tip of the electrode and the tube to thereby melt the electrode and deposit the weld bead on the internal surface of said tube, means carried by the mandrel for removing the slag from the weld bead, and means for introducing a stream of a gaseous medium into the tube at a location behind the electrode with respect to the direction of electrode movement to blow the removed slag to the low end of the tube.

15. An apparatus for welding the internal surface of tubes, comprising means for mounting the tube at an angle to the horizontal, means for rotating the tube about the axis thereof, a welding head including an elongated mandrel disposed within the tube, means for moving the mandrel axially with respect to the tube from the low end of the tube to the high end of the tube, said mandrel having a longitudinal electrode passage terminating at the forward end of said mandrel, means for feeding a consumable electrode through said electrode passage, means for establishing an arc between the forward tip of the electrode and the tube to thereby melt the electrode and deposit a weld bead on the internal surface of said tube, a slag chipping member connected to the mandrel and located above the electrode and disposed to chip the slag from the weld bead, a shield located between the forward tip of the electrode and the slag chipping member for deflecting the slag away from the arc, and means for introducing a stream of a gaseous material at a location behind the electrode with respect to the direction of electrode travel to blow the removed slag to the low end of the tube.

References Cited by the Examiner

UNITED STATES PATENTS

| | | | |
|---|---|---|---|
| 1,298,590 | 3/19 | Smith | 219—124 |
| 2,269,538 | 1/42 | Lewbers | 219—130 |
| 2,427,350 | 9/47 | Carpenter et al. | 219—76 |
| 2,434,481 | 1/48 | Anderson | 219—136 |
| 2,912,562 | 11/59 | Donovan | 219—76 |
| 3,019,327 | 1/62 | Engel | 219—76 |
| 3,028,469 | 4/62 | Bognar | 219—8.5 |

RICHARD M. WOOD, *Primary Examiner.*